(12) United States Patent
Sasaki et al.

(10) Patent No.: US 11,714,016 B2
(45) Date of Patent: Aug. 1, 2023

(54) DIFFERENTIAL PRESSURE DETECTION DEVICE

(71) Applicant: YAMASHIN-FILTER CORP., Kanagawa (JP)

(72) Inventors: Nobuki Sasaki, Kanagawa (JP); Megumi Nomoto, Kanagawa (JP); Tatsuhiro Oshita, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 188 days.

(21) Appl. No.: 17/396,233

(22) Filed: Aug. 6, 2021

(65) Prior Publication Data

US 2021/0364379 A1    Nov. 25, 2021

Related U.S. Application Data

(63) Continuation of application No. PCT/JP2020/007034, filed on Feb. 21, 2020.

(30) Foreign Application Priority Data

Feb. 25, 2019 (JP) ................................. 2019-031227

(51) Int. Cl.
  *G01L 19/14*  (2006.01)
  *F16J 15/02*  (2006.01)
  *G01L 13/02*  (2006.01)

(52) U.S. Cl.
  CPC ........... *G01L 19/147* (2013.01); *F16J 15/022* (2013.01); *G01L 13/025* (2013.01)

(58) Field of Classification Search
  None
  See application file for complete search history.

(56) References Cited

U.S. PATENT DOCUMENTS

| 5,665,920 A * | 9/1997 | Martin ................ G01L 19/0627 73/715 |
| 2005/0081638 A1* | 4/2005 | Couch ................... G01L 9/0042 73/716 |
| 2018/0113011 A1* | 4/2018 | Inoue ................... B01D 37/046 |

FOREIGN PATENT DOCUMENTS

| DE | 102008040729 A1 | 1/2010 |
| JP | S61-190842 U | 11/1986 |

(Continued)

OTHER PUBLICATIONS

Extended European Search Report issued in European Patent Application No. 20762939.5, dated Mar. 18, 2022 (10 pages).

(Continued)

*Primary Examiner* — Lisa M Caputo
*Assistant Examiner* — Nigel H Plumb
(74) *Attorney, Agent, or Firm* — Nakanishi IP Associates, LLC

(57) ABSTRACT

A leakage of liquid inside a differential pressure detection device is reliably preventable. A diaphragm portion that detects a differential pressure as a pressure difference between a high pressure side and a low pressure side includes an annular member, a strain gauge provided in a hollow portion of the annular member, and a first plate and a second plate provided such that the annular member and the strain gauge are sandwiched. The first plate and the second plate each abut on a first annular packing. A first groove and a second groove (the first annular packing) overlap with the annular member when viewed from a first direction along an axis of the first hole.

9 Claims, 4 Drawing Sheets

(56) References Cited

FOREIGN PATENT DOCUMENTS

| JP | H4-143629 A | 5/1992 |
| JP | H5-18840 A | 1/1993 |
| JP | H8-233676 A | 9/1996 |
| JP | 2002-005771 A | 1/2002 |
| JP | 2018-66665 A | 4/2018 |

OTHER PUBLICATIONS

Pedersen C et al: "Relative media pressure compensation technique using rectangular diaphragms" Sensors and Actuators A: Physical, Elsevier BV, NL, vol. 132, No. 2, Nov. 20, 2006, pp. 664-676, XP027935758, ISSN: 0924-4247 (retrieved on Nov. 20, 2006) (10 pages).

International Search Report issued in PCT/JP2020/007034 dated Mar. 17, 2020 with English Translation (5 pages).

* cited by examiner

DIFFERENTIAL PRESSURE DETECTION DEVICE

CROSS-REFERENCE TO RELATED APPLICATIONS

This application is a continuation application of International Patent Application No. PCT/JP2020/007034 filed on Feb. 21, 2020, which claims priority to Japanese Patent Application No. 2019-031227 filed on Feb. 25, 2019, the entire contents of which are incorporated by reference.

TECHNICAL FIELD

The present invention relates to a differential pressure detection device.

BACKGROUND ART

Patent Document 1 discloses a differential pressure sensor in which a metal sheet covering a strain detection unit is provided on a thin film-shaped diaphragm having one surface provided with the strain detection unit, and first and second supporting members support and fix the diaphragm from both sides. Recessed portions are formed in the supporting members, sealing O-rings are provided in the recessed portions, and the sealing O-rings abut on the diaphragm.

CITATION LIST

Patent Literature

Patent Document 1: JP 4-143629 A

In Patent Document 1, the strain detection unit and electrical wiring films are formed on the upper surface of the diaphragm, and therefore unevenness is present on the upper surface of the diaphragm. Furthermore, since the metal sheet covers the upper surface of the diaphragm, the unevenness of the strain detection unit becomes unevenness of the metal sheet as is. Therefore, in Patent Document 1, since the O-ring abuts on the unevenness of the metal sheet, a complete sealing property is lost, and this possibly results in a leakage of liquid from between the O-ring and the diaphragm.

In particular, with the use of the differential pressure sensor for, for example, a filter for fuel or a filter of a urea water SCR system, preventing blocking and damage of an injection nozzle is necessary, and therefore a leakage of liquid inside the differential pressure sensor is not permitted, and thus complete sealing is desired.

SUMMARY OF INVENTION

One or more embodiment of the present invention provide a differential pressure detection device that ensures reliably preventing a leakage of liquid inside the device.

One or more embodiment of the present invention are directed to a differential pressure detection device according to the present invention is, for example, a differential pressure detection device that detects a differential pressure as a pressure difference between a high pressure side and a low pressure side. The differential pressure detection device includes a case, a diaphragm portion, and a fixation member. The case having a substantially columnar shape includes a first hole and a second hole. The first hole opens to a first end as one end face. The second hole has one end opening to a bottom surface of the first hole and the other end opening to a surface other than the first end. The second hole is smaller in diameter than the first hole and substantially along a first direction along an axis of the first hole. The second hole has a third hole opening to the bottom surface of the first hole. The diaphragm portion having a substantially disc shape is provided on the bottom surface of the first hole. The fixation member is provided inside the first hole so as to abut on the diaphragm portion. The fixing member has a fourth hole provided at a position overlapping with the third hole when viewed from the first direction substantially along the first direction so as to pass through the fixing member. The diaphragm portion includes a first plate, a second plate, a strain gauge, and an annular member. The strain gauge is provided on the first plate or the second plate. The annular member has a substantially circular ring shape and is thicker than the strain gauge. The strain gauge is provided in a hollow portion of the annular member. The annular member has a diameter larger than diameters of the third hole and the fourth hole. The first plate and the second plate are provided such that the strain gauge and the annular member are sandwiched. A filling member is filled between the first plate and the second plate. A first groove is provided in the bottom surface of the first hole so as to surround the third hole. The fixing member has a second groove in a surface abutting on the diaphragm portion so as to surround the fourth hole. Positions of the annular member, the first groove, and the second groove overlap when viewed from the first direction. The first groove and the second groove each include an elastically deformable first annular packing. The first plate and the second plate each abut on the first annular packing.

According to the differential pressure detection device according to the one or more embodiment of the present invention, the diaphragm portion that detects the differential pressure as the pressure difference between the high pressure side and the low pressure side includes the annular member, the strain gauge provided in the hollow portion of the annular member, and the first plate and the second plate provided such that the annular member and the strain gauge are sandwiched. The first plate and the second plate each abut on the first annular packing. The first groove and the second groove (the first annular packing) overlap with the annular member when viewed from the first direction along the axis of the first hole. As a result, an amount of elastic deformation of the first annular packing can be increased and sealing performance of the first annular packing can be enhanced. Therefore, a leakage of liquid inside the differential pressure detection device can be reliably prevented.

Here, the first hole and the fixation member may have substantially columnar shapes. A third groove may be provided in a side surface of the fixing member. An elastically deformable second annular packing may be provided in the third groove. The second annular packing may abut on an inner peripheral surface of the first hole. As a result, even when the liquid leaks from between the first annular packing and the first hole, the leakage of the liquid from between the first hole and the fixing member can be reliably prevented.

Here, the annular member may have a hole or a notch along a radial direction of the annular member. A cable connected to the strain gauge may be guided to an outside of the diaphragm portion via the hole or the notch. This allows avoiding unevenness to be generated in a surface of the annular member, that is, the first plate or the second plate, thereby allowing reliably ensuring the sealing performance by the first annular packing.

Here, the third hole may be eccentric to the first hole. The case may have a fifth hole. The fifth hole may open to the bottom surface of the first hole and may be parallel to the third hole. The fifth hole may be positioned opposite to the third hole across the axis of the first hole. The cable may be provided inside the fifth hole. Accordingly, a diameter of the case can be downsized and the differential pressure detection device can be downsized.

Here, the first plate and the second plate may be made of a metal and have thicknesses of approximately 0.2 mm to approximately 0.3 mm. As a result, a strength of the diaphragm portion can be maintained.

One or more embodiment of the present invention ensures reliably preventing the leakage of the liquid inside the differential pressure detection device.

DESCRIPTION OF EMBODIMENTS

Hereinafter, embodiments of the present invention will be described in detail with reference to the drawings. A differential pressure detection device according to the present invention is provided in, for example, a filtration device or a valve provided in a fuel tank or a urea water SCR system and detects a differential pressure that is a pressure difference between a high pressure side and a low pressure side.

Figure 1:
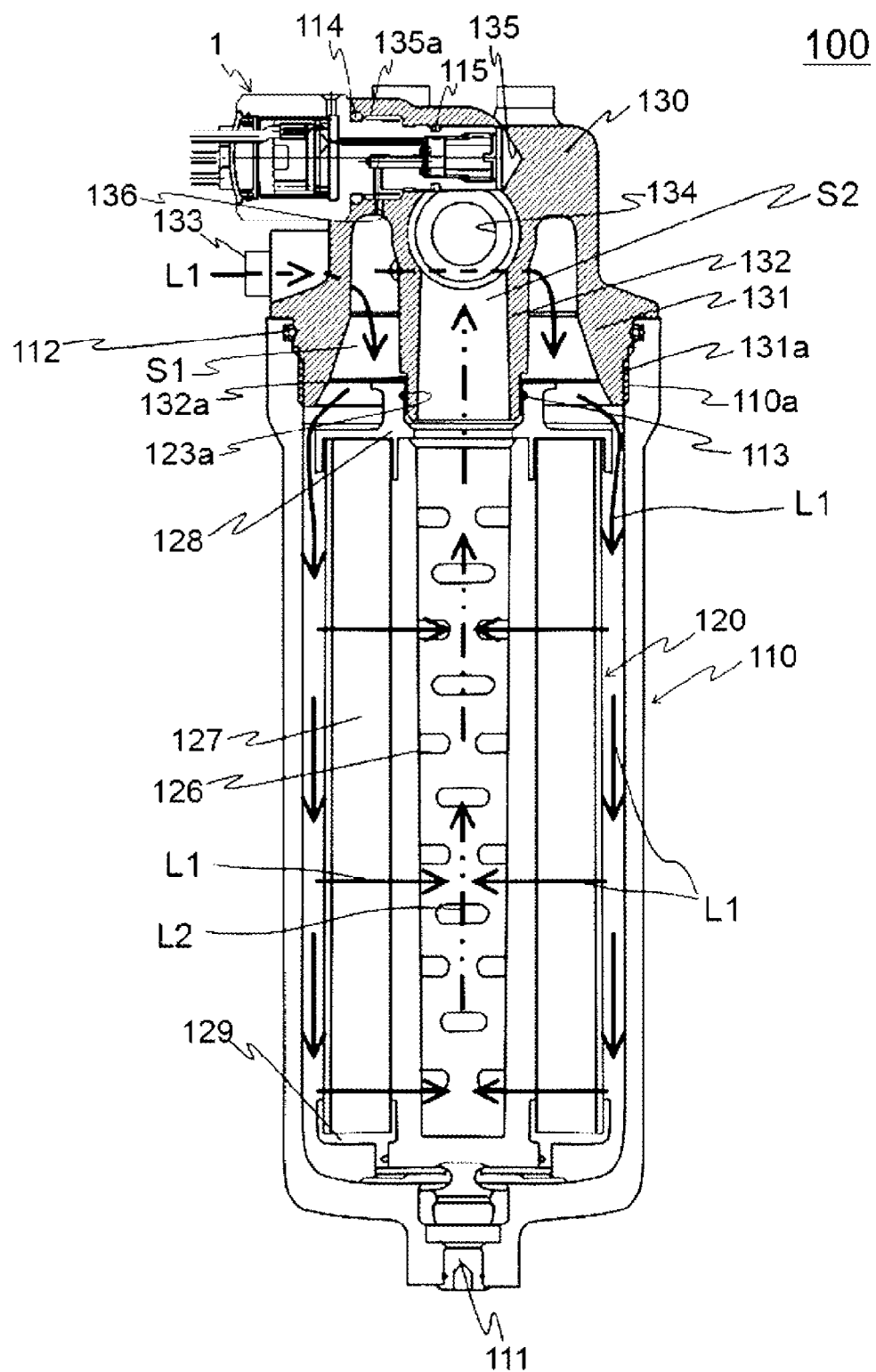
FIG. 1 is a view schematically illustrating a filtration device 100 provided with a differential pressure detection device 1 according to a first embodiment of the present invention.

FIG. 1 is a view schematically illustrating a filtration device 100 provided with a differential pressure detection device 1 according to a first embodiment of the present invention. The filtration device 100 removes, for example, dust contained in a liquid, such as an oil, a fuel, and urea water, using a filter. Note that in FIG. 1, hatching that indicates a cross section is partly omitted.

The filtration device 100 mainly includes a housing 110, a filter element 120, and a head 130.

The housing 110 is a member having a substantially bottomed cylindrical shape including one end substantially closed, and the other end open. A lower end of the housing 110 is provided with a drain 111. Note that the drain 111 is not essential.

An opening of the housing 110 is attached to the head 130. When the housing 110 is attached to the head 130, the filter element 120 is attached to a central tube 132 (described in detail below) of the head 130. Accordingly, the filter element 120 is housed inside the housing 110.

The filter element 120 mainly includes an inner tube 126, a filtration member 127, and plates 128 and 129 provided in both ends of the filtration member 127, respectively. The inner tube 126 is a member having a substantially hollow cylindrical shape including both ends open, and is formed by using a material having high corrosion resistance (for example, a resin or metal).

The filtration member 127 has a substantially hollow cylindrical shape having the thickness in the radial direction. The filtration member 127 is formed by pleating filter paper having a sheet-like shape and formed by using a synthetic resin, paper, or the like, and connecting both ends of the filter paper pleated to roll the filter paper.

One end (an end in the upper side in FIG. 1) of the filtration member 127 is provided with the plate 128, and the other end (an end in the lower side in FIG. 1) of the filtration member 127 is provided with the plate 129. The plate 128 and the plate 129 are formed using a material having high corrosion resistance.

The plate 128 is provided in the upper end of the filtration member 127. The central tube 132 (described in detail below) of the head 130 is inserted into the plate 128. A sealing member 113 (for example, an O-ring) is provided between the plate 128 and the central tube 132. The plate 128 and the central tube 132 are sealed by the sealing member 113 such that liquid does not leak outside between the plate 128 and the central tube 132. Additionally, since the plate 128 is provided with the inner tube 126, when the central tube 132 is inserted into the plate 128, an internal space of the inner tube 126 communicates with an internal space of the central tube 132.

The head 130 mainly includes a body 131, the central tube 132, an inflow path 133, an outflow path 134, and a mounting cavity 135.

The body 131 is formed using a material having high corrosion resistance. The body 131 has a tubular portion having a substantially bottomed cylindrical shape, and has an external thread portion 131a in an outer peripheral surface of the vicinity of an open end of the tubular portion. When the external thread portion 131a is threadedly engaged with an internal thread portion 110a formed in an inner periphery of the housing 110, the housing 110 is attached to the head 130.

A sealing member 112 (for example, an O-ring) is provided between the housing 110 and the head 130. The housing 110 and the head 130 are sealed by the sealing member 112 such that liquid does not leak outside between the housing 110 and the head 130.

The central tube 132 has a substantially cylindrical shape, and is integrally formed with the body 131. The central tube 132 protrudes from a substantially center of a bottom surface of the body 131 in the same direction as the direction of a side surface of the body 131. A recessed portion 132a to be inserted into a hollow portion 123a of the plate 128 is formed in an outer peripheral surface of the central tube 132.

The inflow path 133 and the outflow path 134 are substantially tubular. A space S1 formed by the side surface of the body 131 and the central tube 132 (a space outside the central tube 132) communicates with the inflow path 133. Additionally, a space S2 inside the central tube 132 communicates with the outflow path 134.

A liquid L1 to be filtered is supplied to the filtration device 100 via the inflow path 133. The liquid L1 (see the solid line arrows in FIG. 1) flows into the housing 110, and is subsequently filtered by the filtration member 127 to flow out to the inside of the inner tube 126. Additionally, a liquid L2 that after filtration flowed out to the inside of the inner tube 126 (see the two-dot chain line arrows in FIG. 1) is discharged to the outside of the filtration device 100 through the outflow path 134.

The mounting cavity 135 is formed in the vicinity of the bottom surface of the body 131. The differential pressure detection device 1 is provided in the mounting cavity 135. An internal thread portion 135a is formed in a side surface of the mounting cavity 135. When an external thread portion 18 (see FIG. 2) formed in the differential pressure detection device 1 is threadedly engaged with the internal thread portion 135a, the differential pressure detection device 1 is attached to the head 130.

Sealing members 114 and 115 (for example, O-rings) are provided between the mounting cavity 135 and the differential pressure detection device 1. The mounting cavity 135 and the differential pressure detection device 1 are sealed by the sealing members 114 and 115 such that liquid does not leak outside between the mounting cavity 135 and the differential pressure detection device 1.

The vicinity of a bottom portion of the mounting cavity 135 communicates with the outflow path 134, that is, the space S2. Since a bottom surface of the differential pressure detection device 1 is open, the space S2 communicates with a hole 11 (described in detail below) inside the differential pressure detection device 1.

Additionally, the internal thread portion 135a of the mounting cavity 135 communicates with the space S1 via a hole 136. The space S1 communicates with a hole 12 (described in detail below) inside the differential pressure detection device 1.

Figure 2:
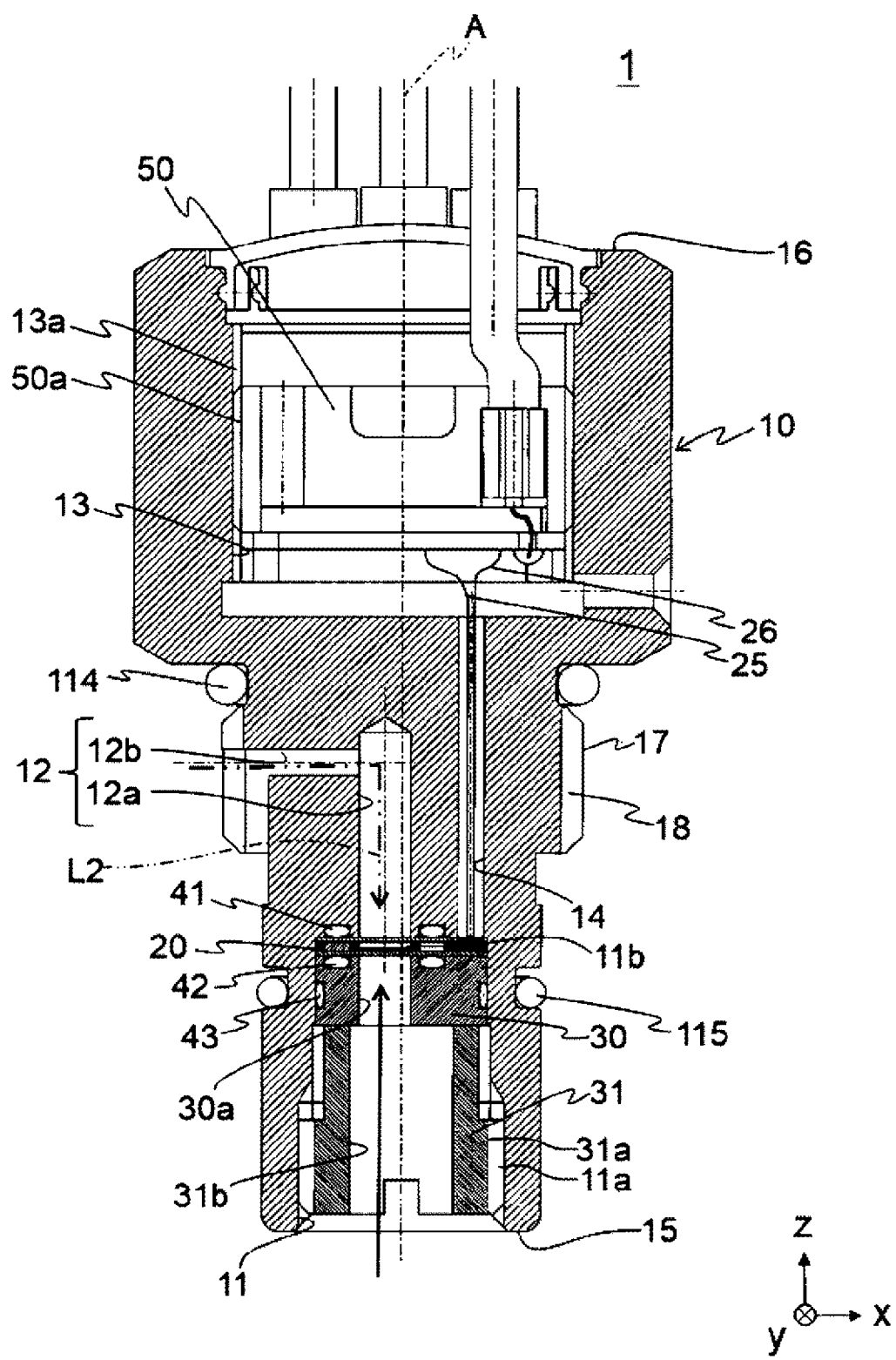
FIG. 2 is a cross-sectional view of the differential pressure detection device 1.

Next, the differential pressure detection device 1 will be described in detail. FIG. 2 is a cross-sectional view of the differential pressure detection device 1. In FIG. 2, hatching for indicating a cross section is partially omitted.

The differential pressure detection device 1 mainly includes a case 10, a diaphragm portion 20, a fixing member 30, a mounting member 31, annular packings 41, 42, and 43, and a detection unit 50.

The case 10 has a substantially columnar shape and has the hole 11, the hole 12, a hole 13, and a hole 14.

The hole 11 has a substantially columnar shape and is open to an end face 15 of the case 10. An internal thread portion 11a is formed in an inner peripheral surface of the hole 11.

The diaphragm portion 20, the fixing member 30, and the mounting member 31 are mainly provided inside the hole 11. The diaphragm portion 20 is provided on a bottom surface 11b of the hole 11. The fixing member 30 is a substantially columnar-shaped member and abuts on the diaphragm portion 20. The mounting member 31 is a substantially columnar-shaped member, and an external thread portion 31a is formed on the outer peripheral surface.

The external thread portion 31a is threadedly engaged with the internal thread portion 11a, and thus the diaphragm portion 20 and the fixing member 30 are provided inside the hole 11 such that the heights (the positions in the z direction) are adjustable. The mounting member 31 is provided inside the hole 11 such that the mounting member 31 pushes up the diaphragm portion 20 and the fixing member 30, the fixing member 30 is pressed against the diaphragm portion 20, and the diaphragm portion 20 is pressed against the bottom surface 11b.

The fixing member 30 has a hole 30a (substantially along the z direction) substantially along an axis A of the case 10 and the hole 11, and the hole 30a is provided so as to pass through the fixing member 30. Furthermore, the mounting member 31 has a hole 31b substantially along the z direction, and the hole 31b is provided so as to pass through the mounting member 31. In this way, an end face (a plate 22, described in detail below) on the -z side of the diaphragm portion 20 communicates with the space S2 via the hole 11, and the liquid L2 after filtration is guided to the end face of on the -z side of the diaphragm portion 20. The diaphragm portion 20 will be described in detail later.

The hole 12 has one end opening to the bottom surface 11b of the hole 11 and the other end opening to a surface other than the end face 15 (here, a side surface 17). The hole 12 has a vertical hole 12a and a horizontal hole 12b. The vertical hole 12a is smaller in diameter than the hole 11 and substantially along the z direction. One end of the vertical hole 12a opens to the bottom surface 11b of the hole 11. The horizontal hole 12b has one end opening to the vertical hole 12a and the other end opening to the side surface 17. In this way, the end face on the +z side (a plate 21, described in detail below) of the diaphragm portion 20 communicates with the space S1 via the hole 12, and the liquid L1 before filtration is guided to the end face on the +z side of the diaphragm portion 20.

When viewed in the +z direction or the -z direction, the hole 30a and the hole 31b are provided at positions overlapping with the vertical hole 12a.

Thus, the diaphragm portion 20 can be deformed by a minute amount by a pressure difference between the liquid L1 before filtration and the liquid L2 after filtration.

The hole 13 has a substantially cylindrical shape and opens to an end face 16 of the case 10. The detection unit 50 is provided in the hole 13. The detection unit 50 has a substantially cylindrical shape and has, for example, a substrate. An external thread portion 50a is formed around the detection unit 50. The external thread portion 50a is threadedly engaged with the internal thread portion 13a, and thus the detection unit 50 is provided inside the hole 13 such that the height (the position in the z direction) is adjustable.

The hole 14 is a hole substantially parallel to the vertical hole 12a, and having one end opening to the bottom surface 11b of the hole 11 and the other end opening to the hole 13. The hole 12 is eccentric to the hole 11, and the hole 14 is positioned opposite to the hole 13 across the axis of the hole 11. In other words, the hole 14 is provided in a space formed by the eccentricity of the hole 12. As a result, the diameter of the case 10 can be reduced, and the differential pressure detection device 1 can be downsized.

Cables 25 and 26 are provided inside the hole 14, and the cables 25 and 26 transmit electrical signals generated in a strain gauge 23 (discussed in detail below) to the detection unit 50.

Figure 3:
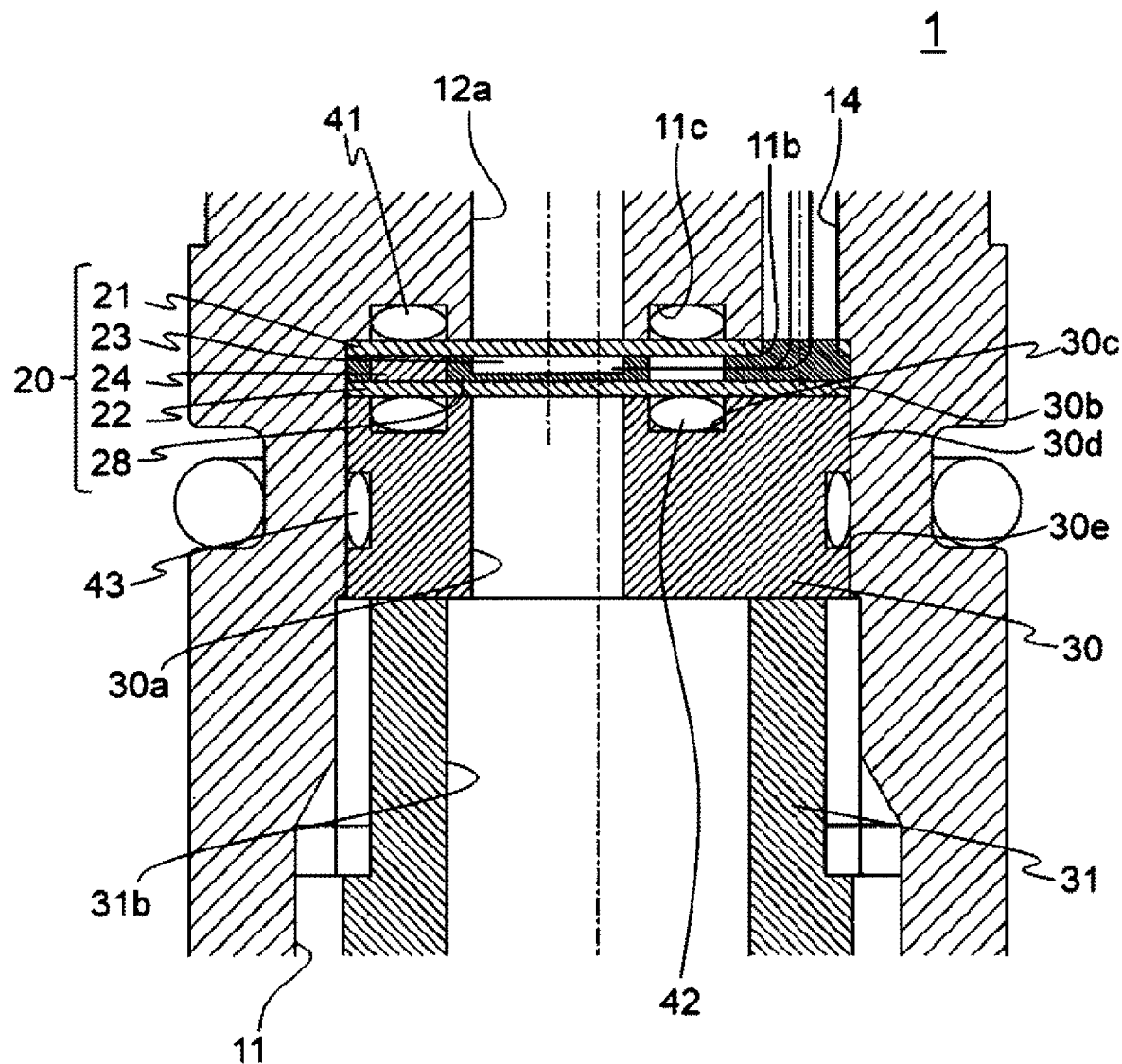
FIG. 3 is an enlarged partial view of FIG. 2.
Figure 4:
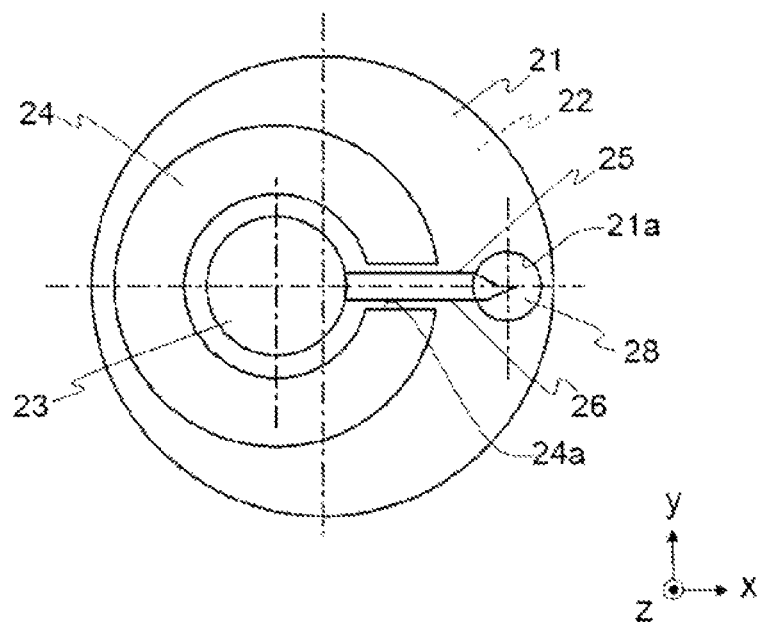
FIG. 4 is a plan view of a diaphragm portion 20.

FIG. 3 is an enlarged partial view of FIG. 2. In FIG. 3, hatching for indicating a cross section is partially omitted. FIG. 4 is a plan view of the diaphragm portion 20. In FIG. 4, the main parts of the diaphragm portion 20 are transparent.

The diaphragm portion 20 has a substantially disc shape, and is sandwiched between the bottom surface 11b and the fixing member 30. The diaphragm portion 20 mainly includes the plates 21 and 22, the strain gauge 23, and an annular member 24.

The plates 21 and 22 are plate-like members of metal or resin, and are provided such that the strain gauge 23 and the annular member 24 are sandwiched between both sides. Here, the "plate-like member" refers to a member having a thickness with which, for example, bending and winding are difficult (for example, approximately 0.1 mm or more in the case of a metal plate), and thicker than a sheet and a film that can be bent or wound.

In the present embodiment, the plates 21 and 22 are made of a metal (e.g. stainless steel) and have a thickness of approximately 0.2 mm to approximately 0.3 mm. This allows a minute amount of deformation when subjected to pressure from the liquid, and can maintain the strength of the diaphragm portion 20.

The strain gauge 23 is provided on the plate 21 or the plate 22 (the plate 21 in the present embodiment). The strain gauge 23 is provided with a metal wire therein, the metal wire expands and contracts in accordance with the extension and shrinkage of a measured object (here, the plate 21 or the plate 22), and a change in an electrical resistance of the metal wire is measured to obtain the extension and shrinkage (a strain) of the measured object. The cables 25 and 26 are connected to the metal wire. The diameter of the strain gauge 23 is preferably less than or equal to the diameters of the vertical hole 12$a$ and the hole 30$a$.

The strain gauge 23 is provided in a hollow portion of the annular member 24. The annular member 24 is a plate-like member having a substantially circular ring shape, and has a thickness thicker than the strain gauge 23. Thus, an interval between the plate 21 and the plate 22 is wider than the thickness of the strain gauge 23, thereby preventing a collapse of the strain gauge 23.

The diameter of the annular member 24 is larger than those of the vertical hole 12$a$ and the hole 30$a$. Thus, when viewed in the +z direction or the −z direction, the strain gauge 23 can be positioned at a position overlapping with the vertical hole 12$a$ and the hole 30$a$, and the strain gauge 23 can accurately detect the amounts of deformation (i.e., the differential pressures) of the plate 21 and the plate 22.

The annular member 24 has a notch 24$a$ through which the cables 25 and 26 pass. The notch 24$a$ is formed along the radial direction of the annular member 24. The cables 25 and 26 are guided to the outside of the diaphragm portion 20 via the notch 24$a$ and a hole 21$a$ formed in the plate 21. This allows avoiding unevenness to be generated in the surface of the annular member 24, that is, the plate 21 or the plate 22.

A filling member 28 is filled between the plate 21 and the plate 22. Although the thickness of the strain gauge 23 is thinner than the thickness of the annular member 24 (the interval between the plate 21 and the plate 22), filling the filling member 28 between the plate 21 and the plate 22 allows detecting the strain of the plate 22, in addition to the strain of the plate 21, by the strain gauge 23.

The filling member 28 is a polymer material composed of a polymer substance (typically having a molecular weight of 10000 or greater), and includes, for example, resin and rubber. In the present embodiment, a (cyanoacrylate-based or epoxy-based) adhesive for the strain gauge 23 or urethane resin is used as the filling member 28.

A groove 11$c$ is provided in the bottom surface 11$b$ of the hole 11 so as to surround the vertical hole 12$a$. In addition, a groove 30$c$ is provided in a surface 30$b$ abutting on the diaphragm portion 20 of the fixing member 30 so as to surround the hole 30$a$. An elastically deformable annular packing 41 is provided in the groove 11$c$, and an elastically deformable annular packing 42 is provided in the groove 30$c$. The annular packings 41 and 42 are sealing members, for example, O-rings.

The annular packing 41 abuts on the plate 21 and the annular packing 42 abuts on the plate 22. This allows avoiding liquid to leak from between the diaphragm portion 20 and the bottom surface 11$b$ and between the diaphragm portion 20 and the surface 30$b$. Furthermore, when viewed from the +z direction or the −z direction, the positions of the annular member 24, the groove 11$c$ (the annular packing 41), and the groove 30$c$ (the annular packing 42) overlap. As a result, even when the amounts of elastic deformation of the annular packings 41 and 42 are increased and the annular packings 41 and 42 are pressed against the plates 21 and 22 strongly, the diaphragm portion 20 does not collapse and the force is not applied to the strain gauge 23. This allows reliably avoiding the liquid to leak from between the diaphragm portion 20 and the bottom surface 11$b$ and between the diaphragm portion 20 and the surface 30$b$ while accurately keeping measurement performance of the strain gauge 23.

A groove 30$e$ is provided in a side surface 30$d$ of the fixing member 30. An elastically deformable annular packing 43 (for example, an O-ring) is provided in the groove 30$e$, and the annular packing 43 abuts on the inner peripheral surface of the hole 11. This allows reliably avoiding a leaking of liquid from between the fixing member 30 and the case 10 (the hole 11).

Next, an action of the differential pressure detection device 1 will be described using FIG. 2. For example, due to a clogging of the filtration member 127 (see FIG. 1), when a pressure of the space S1 increases, the diaphragm portion 20 is pressed down in the −z direction by the liquid on the high pressure side (the liquid L1 before filtration) and the plate 21 deforms. The plate 21 deforms in accordance with the pressure difference (the differential pressure) between the liquid L1 before filtration (the space S1, the high pressure side) and the liquid L2 after filtration (the space S2, the low pressure side). The strain gauge 23 outputs a signal with a magnitude according to the amount of deformation of the plate 21 to the detection unit 50 via the cables 25 and 26. As a result, the differential pressure detection device 1 detects the differential pressure between the high pressure side and the low pressure side.

According to the present embodiment, the thickness of the annular member 24 (the interval between the plate 21 and the plate 22) is thicker than the thickness of the strain gauge 23, and the position where the annular packing 41 abuts on the plate 21, and the position where the annular packing 42 abuts on the plate 22 are set to the positions overlapping with the annular member 24 viewed in the +z direction or the −z direction. This allows reliably avoiding the leakage of the liquid from between the diaphragm portion 20 and the bottom surface 11$b$ and between the diaphragm portion 20 and the surface 30$b$ without collapsing the strain gauge 23.

In particular, with the use of the differential pressure detection device 1 for, for example, a filter for fuel or a filter of a urea water SCR system, preventing blocking and damage of an injection nozzle is necessary, and therefore a leakage of liquid inside the differential pressure detection device 1 is not permitted. According to the present embodiment, since the position where the annular packing 41 abuts on the plate 21 and the position where the annular packing 42 abuts on the plate 22 overlap with the annular member 24 viewed in the +z direction or the −z direction, by increasing the amounts of elastic deformation of the annular packings 41 and 42 and increasing the sealing performance of the annular packings 41 and 42, the leakage of liquid inside the differential pressure detection device 1 can be reliably prevented.

In addition, according to the present embodiment, by providing the annular packing 43 between the fixing member 30 and the hole 11, the leakage of liquid inside the differential pressure detection device 1 can be more reliably prevented.

Figure 5:
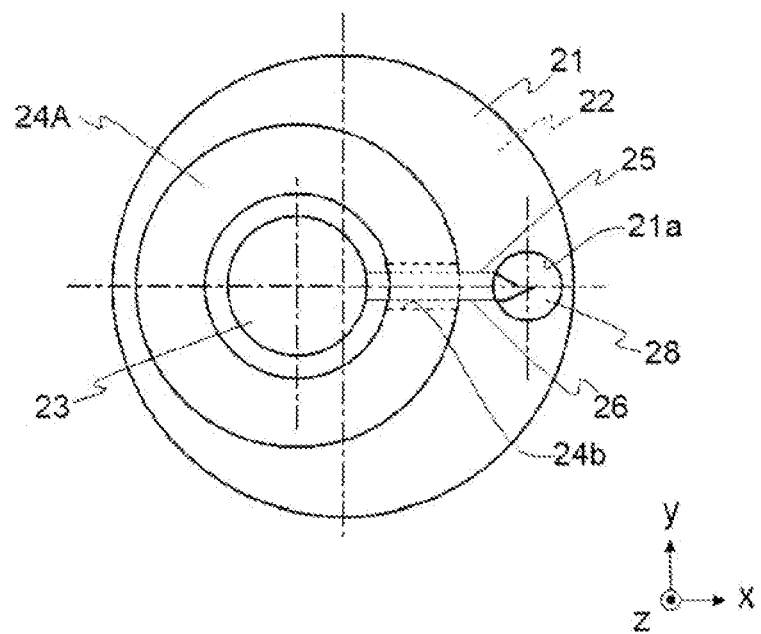
FIG. 5 is a plan view of a diaphragm portion 20A.

Note that in the present embodiment, the annular member 24 has the notch 24$a$ formed along the radial direction of the annular member 24, and the cables 25 and 26 are guided to the outside of the diaphragm portion 20 via the notch 24$a$, but the method of guiding the cables to the outside of the diaphragm portion is not limited thereto. FIG. 5 is a plan view of a diaphragm portion 20A according to a modified example. In FIG. 5, the main parts of the diaphragm portion 20A are transparent.

The diaphragm portion 20A mainly includes the plate 21 and 22, the strain gauge 23, and an annular member 24A. Similar to the annular member 24, the annular member 24A is a member having a substantially circular ring shape thicker than the strain gauge 23, and has a hole 24b formed along the radial direction of the annular member 24A. The hole 24b is a hole that passes through the annular member 24A in the radial direction, and the cross-sectional shape may be, for example, a substantially circular shape, a substantially oval shape, or a substantially rectangular shape. The cables 25 and 26 are guided to the outside of the diaphragm portion 20 via the hole 24b and the hole 21a.

In addition, in the present embodiment, the annular packing 43 is provided between the fixing member 30 and the hole 11, but the annular packing 43 is not essential because the liquid can be prevented from leaking by the annular packings 41 and 42. However, by providing the annular packing 43, even when the liquid L1 before filtration leaks from between the diaphragm portion 20 and the bottom surface 11b of the hole 11 and flows between the side surface of the hole 11 and the fixing member 30, the annular packing 43 stops the liquid L1 before filtration, and this allows reliably preventing the liquid L1 before filtration from flowing out into the hole 11 from between the side surface of the hole 11 and the fixing member 30 and preventing the liquid L1 before filtration from mixing with the liquid L2 after filtration. Accordingly, providing the annular packing 43 between the fixing member 30 and the hole 11 is desirable.

In addition, in the present embodiment, the mounting member 31 for providing the diaphragm portion 20 and the fixing member 30 to the inside of the hole 11 is provided, but the mounting member 31 is not essential.

The embodiments of the invention are described above in detail with reference to the drawings. However, specific configurations are not limited to the embodiments and also include changes in design or the like without departing from the gist of the invention. A person skilled in the art can appropriately change, add, and convert each element in the embodiments.

Additionally, in the present invention, "substantially" is a concept not only including the case of being strictly the same, but also including an error and deformation to the extent that a loss of identity does not occur. For example, "substantially parallel" is not limited to the case of being strictly parallel, and is, for example, a concept including some errors. Additionally, for example, the case of expressing "parallel," "orthogonal," "matching," and the like includes not only the case of being strictly parallel, orthogonal, matching, and the like, but also the case of being substantially parallel, substantially orthogonal, substantially matching, and the like. Additionally, in the present invention, "vicinity" means to include a region in a certain range (the range can be determined arbitrarily) near a reference position. For example, the case of expressing "in the vicinity of A" is a concept that a region in a certain range near A may include A or may not include A.

REFERENCE SIGNS LIST

1: Differential pressure detection device
10: Case
11, 12, 13, 14: Hole
11a: Internal thread portion
11b: Bottom surface
11c: Groove
12a: Vertical hole
12b: Horizontal hole
13a: Internal thread portion
15, 16: End face
17: Side surface
18: External thread portion
20, 20A: Diaphragm portion
21, 22: Plate
21a: Hole
23: Strain gauge
24, 24A: Annular member
24a: Notch
24b: Hole
25, 26: Cable
28: Polymer material
30: Fixing member
30a: Hole
30b: Surface
30c: Groove
30d: Side surface
30e: Groove
31: Mounting member
31a: External thread portion
31b: Hole
41, 42, 43: Annular packing
50: Detection unit
50a: External thread portion
100: Filtration device
110: Housing
110a: Internal thread portion
111: Drain
112, 113, 114, 115: Sealing Member
120: Filter element
123a: Hollow portion
126: Inner tube
127: Filtration member
128, 129: Plate
130: Head
131: Body
131a: External thread portion
132: Central tube
132a: Stepped portion
133: Inflow path
134: Outflow path
135: Mounting cavity
135a: Internal thread portion
136: Hole

The invention claimed is:

1. A differential pressure detection device that detects a differential pressure as a pressure difference between a high pressure side and a low pressure side, the differential pressure detection device comprising:

a case having a columnar shape that includes a first hole and a second hole, the first hole opening to a first end as one end face, the second hole having one end opening to a bottom surface of the first hole and the other end opening to a surface other than the first end, the second hole being smaller in diameter than the first hole and along a first direction along an axis of the first hole, the second hole having a third hole opening to the bottom surface of the first hole;

a diaphragm portion having a disc shape provided on the bottom surface of the first hole; and a fixation member provided inside the first hole so as to abut on the diaphragm portion, the fixing member having a fourth hole provided at a position overlapping with the third hole when viewed from the first direction along the first direction so as to pass through the fixing member, wherein the diaphragm portion includes a first plate, a second plate, a strain gauge, and an annular member, the strain gauge is provided on the first plate or the second plate, and the annular member has a circular ring shape and is thicker than the strain gauge;

the strain gauge is provided in a hollow portion of the annular member;

the annular member has a diameter larger than diameters of the third hole and the fourth hole;

the first plate and the second plate are provided such that the strain gauge and the annular member are sandwiched;

a filling member is filled between the first plate and the second plate;

a first groove is provided in the bottom surface of the first hole so as to surround the third hole;

the fixing member has a second groove in a surface abutting on the diaphragm portion so as to surround the fourth hole;

positions of the annular member, the first groove, and the second groove overlap when viewed from the first direction;

the first groove and the second groove each include an elastically deformable first annular packing; and the first plate and the second plate each abut on the first annular packing.

2. The differential pressure detection device according to claim 1, wherein the first hole and the fixation member have columnar shapes;

a third groove is provided in a side surface of the fixing member;

an elastically deformable second annular packing is provided in the third groove, and the second annular packing abuts on an inner peripheral surface of the first hole.

3. The differential pressure detection device according to claim 2, wherein the annular member has a hole or a notch along a radial direction of the annular member; and a cable connected to the strain gauge is guided to an outside of the diaphragm portion via the hole or the notch.

4. The differential pressure detection device according to claim 2, wherein the first plate and the second plate are made of a metal and have thicknesses of approximately 0.2 mm to approximately 0.3 mm.

5. The differential pressure detection device according to claim 1, wherein the annular member has a hole or a notch along a radial direction of the annular member; and a cable connected to the strain gauge is guided to an outside of the diaphragm portion via the hole or the notch.

6. The differential pressure detection device according to claim 5, wherein the third hole is eccentric to the first hole;

the case has a fifth hole, and the fifth hole opens to the bottom surface of the first hole and is parallel to the third hole;

the fifth hole is positioned opposite to the third hole across the axis of the first hole; and the cable is provided inside the fifth hole.

7. The differential pressure detection device according to claim 6, wherein the first plate and the second plate are made of a metal and have thicknesses of approximately 0.2 mm to approximately 0.3 mm.

8. The differential pressure detection device according to claim 5, wherein the first plate and the second plate are made of a metal and have thicknesses of approximately 0.2 mm to approximately 0.3 mm.

9. The differential pressure detection device according to claim 1, wherein the first plate and the second plate are made of a metal and have thicknesses of approximately 0.2 mm to approximately 0.3 mm.

* * * * *